US008392283B2

(12) United States Patent
Shedletsky, III

(10) Patent No.: US 8,392,283 B2
(45) Date of Patent: Mar. 5, 2013

(54) METHOD FOR SORTING AND DISPLAYING ITEMS IN A VIRTUAL CATALOG

(75) Inventor: John James Shedletsky, III, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 22 days.

(21) Appl. No.: 13/029,393

(22) Filed: Feb. 17, 2011

(65) Prior Publication Data

US 2012/0215655 A1 Aug. 23, 2012

(51) Int. Cl.
*G06Q 30/00* (2012.01)
(52) U.S. Cl. .................... 705/26.7; 705/26.1
(58) Field of Classification Search .......... 705/26.1, 705/26.7, 27.1
See application file for complete search history.

(56) References Cited

U.S. PATENT DOCUMENTS

| | | | | |
|---|---|---|---|---|
| 2008/0313018 | A1* | 12/2008 | Kamm et al. | 705/10 |
| 2009/0216636 | A1* | 8/2009 | Eliason | 705/14 |
| 2011/0212762 | A1* | 9/2011 | Ocko et al. | 463/25 |
| 2011/0238505 | A1* | 9/2011 | Chiang et al. | 705/14.69 |
| 2012/0035978 | A1* | 2/2012 | Haynes et al. | 705/7.29 |

OTHER PUBLICATIONS

Hertz, Lawrence M, "Advertising transactions on the Internet," Computer and Internet Lawyer, May 2002, vol. 19(5), p. 26.*

* cited by examiner

*Primary Examiner* — Brandy A Zukanovich
(74) *Attorney, Agent, or Firm* — Donald R. Boys; Central Coast Patent Agency, Inc.

(57) ABSTRACT

A computing appliance is provided and includes a processor, an Internet interface, a data store containing virtual catalog items for service through a website, and software executing from a machine-readable physical medium causing the computing appliance to record the number of impressions of each of the items that has occurred over a defined period, record the number of sales of each of items that has occurred over the defined period, calculate the average sales price for each of the items for the defined period, multiply the average sales price by the number of sales calculated previously for each item, divide the total sales figure derived for each item by the total number of impressions calculated for that item over the defined period deriving a revenue contribution value for each item, and in response to a request to display items, serving the items included in the request according to highest revenue contribution value.

19 Claims, 5 Drawing Sheets

METHOD FOR SORTING AND DISPLAYING ITEMS IN A VIRTUAL CATALOG

BACKGROUND OF THE INVENTION

1. Field of the Invention

The present invention is in the field of ecommerce and pertains particularly to methods and apparatus for sorting and displaying virtual items for display through a website.

2. Discussion of the State of the Art

In ecommerce, items that are generally for sale by an enterprise may be represented to consumers through a website display interface. Users or visitors may then buy one or more items displayed by them using a display interface to order displays of the items for viewing and selection.

In various business models optimizing item thumbnail displays is practiced to help the consumer select an item and hopefully make a purchase. Sorts of this type may include sorting according to item popularity or item price. A problem with many current sorting methods is that the criteria used for the sort has no real and direct relation to incoming revenue caused by the sale of those items in aggregate. Therefore, the optimizations made to display items do not work to increase revenue directly and consistently.

Therefore, what is clearly needed is a method for sorting virtual items in a virtual catalog and displaying those items according to highest revenue contribution value or performance of those items over time. A sort optimization such as this would have a direct positive effect on revenue taken in from the sale of those items.

SUMMARY OF THE INVENTION

The problem stated above is that optimized presentation of items for sale by revenue contribution in a hosted web-based navigable catalog is desirable for a web-based business, but many of the conventional means for optimizing navigable catalogs, such as by enabling category and keyword search, or sorts based on popularity of such items do not provide any optimization by revenue contribution to the hosting enterprise and can create more latency between the time of access of the catalog and the eventual purchase of the item. The inventors therefore considered functional elements of a web-based, navigable, catalog, looking for elements that exhibit interoperability that could potentially be harnessed to provide optimization based on revenue contribution but in a manner that would not create drag.

Every web-based enterprise is propelled by patronage, one by-product of which is an abundance of customers interacting with and purchasing items provided by, and engaging in services of the enterprise. Most such enterprises employ online catalogs and web-based server applications to conduct the sales activities and service engagements of the business, and virtual catalogs with limited display capabilities and web-based server applications are typically a part of such apparatus.

The present inventor realized in an inventive moment that if, at the point of contact, items for sale in a virtual catalog could be caused to display in a hierarchical manner according to history of revenue contribution to the enterprise, significant increases in revenue over similar time periods or windows might result. The inventor therefore constructed a unique system for sorting items for display in a virtual catalog that allowed items in each category or all together to be hierarchically ordered in display based on the contribution power of those items to the web-based enterprise. A significant increase in revenue taken in over a same time period results, with no impediment to or interruption of traditional display options created.

Accordingly, in an embodiment of the present invention, a computing appliance is provided and includes a processor, an interface to the Internet, a data store containing a number of virtual catalog items for service through a website, and software executing from a machine-readable physical medium, the software causing the computing appliance to record a number of impressions of each of the virtual catalog items that has occurred over a defined period, record a number of sales of each of the virtual catalog items that has occurred over the defined period, calculate the average sales price for each of the virtual catalog items for the defined period, multiply the average sales price by the number of sales calculated previously for each item, divide the total sales figure derived for each item by the total number of impressions calculated for that item over the defined period deriving a revenue contribution value for each item, and in response to a request to display items, serving individual ones of the items included in the request according to highest revenue contribution value for those items.

In one embodiment, the appliance is a web server. In one embodiment, the virtual catalog is navigated by a display interface on a web page. In one embodiment, the virtual items are gaming elements. In one embodiment, the sales price is expressed in virtual currency. In this embodiment, the virtual currency used to buy virtual items is purchased by users with real currency.

In one embodiment, the computing appliance further includes a machine instruction inserted before the display function, for inserting one or more items into the display based on a predicted likelihood of the one or items being purchased. In one embodiment, the hierarchical sort order is preserved subject to categorical, keyword, or author-based search of the virtual items for customized display.

According to one aspect of the present invention, a method is provided for determining a hierarchical order of display of virtual items contained in a virtual catalog accessible from a web page. The method includes the steps (a) for each of a number of items in the virtual catalog, calculating a number of impressions of the items that occurred over a defined period, (b) for each or the number of items in the virtual catalog, calculating a number of sales of the virtual item that occurred over the defined period, (c) for each of the number of items in the virtual catalog, calculating the average sales price for the virtual item over the defined period, (d) for each of the number of items in the virtual catalog, multiplying the average sales price deduced in (c) by the number of sales deduced in (b) deriving a total sales value for each item, (e) dividing the total sales values for each item deduced in (d) by the total number of impressions deduced in (a) of that item deriving a revenue contribution value, and (f) in response to a request, performing a hierarchical sort of virtual catalog items for item display, displaying the items according to revenue contribution value per item included in the request.

In one aspect of the method, in step (a), the defined period is the total history of each item. In one aspect, the virtual catalog is navigated by a display interface on a web page. In one aspect of the method, the virtual items are gaming elements. In one aspect, in step (c), the sales price is expressed in virtual currency. In this aspect, the virtual currency used to buy virtual items is purchased by users with real currency.

In one aspect the method further includes a step inserted before display at step (f), for inserting one or more virtual catalog items into the visible display based on a predicted likelihood of the one or more items being purchased by the user. In one aspect, in step (f), the hierarchical sort order of revenue contribution value is preserved subject to categorical, keyword, or author-based search of the virtual items for customized display.

In a preferred aspect, in step (f), the virtual items included in the request are displayed according to highest revenue contribution value first.

BRIEF DESCRIPTION OF THE DRAWING FIGURES

DETAILED DESCRIPTION

The inventors provide software on a digital medium coupled to a server that enables any virtual catalog of items for display to be optimized according to contribution value to the enterprise. The present invention will be described in enabling detail using the following examples, which may describe more than one relevant embodiment falling within the scope of the present invention.

Figure 1:
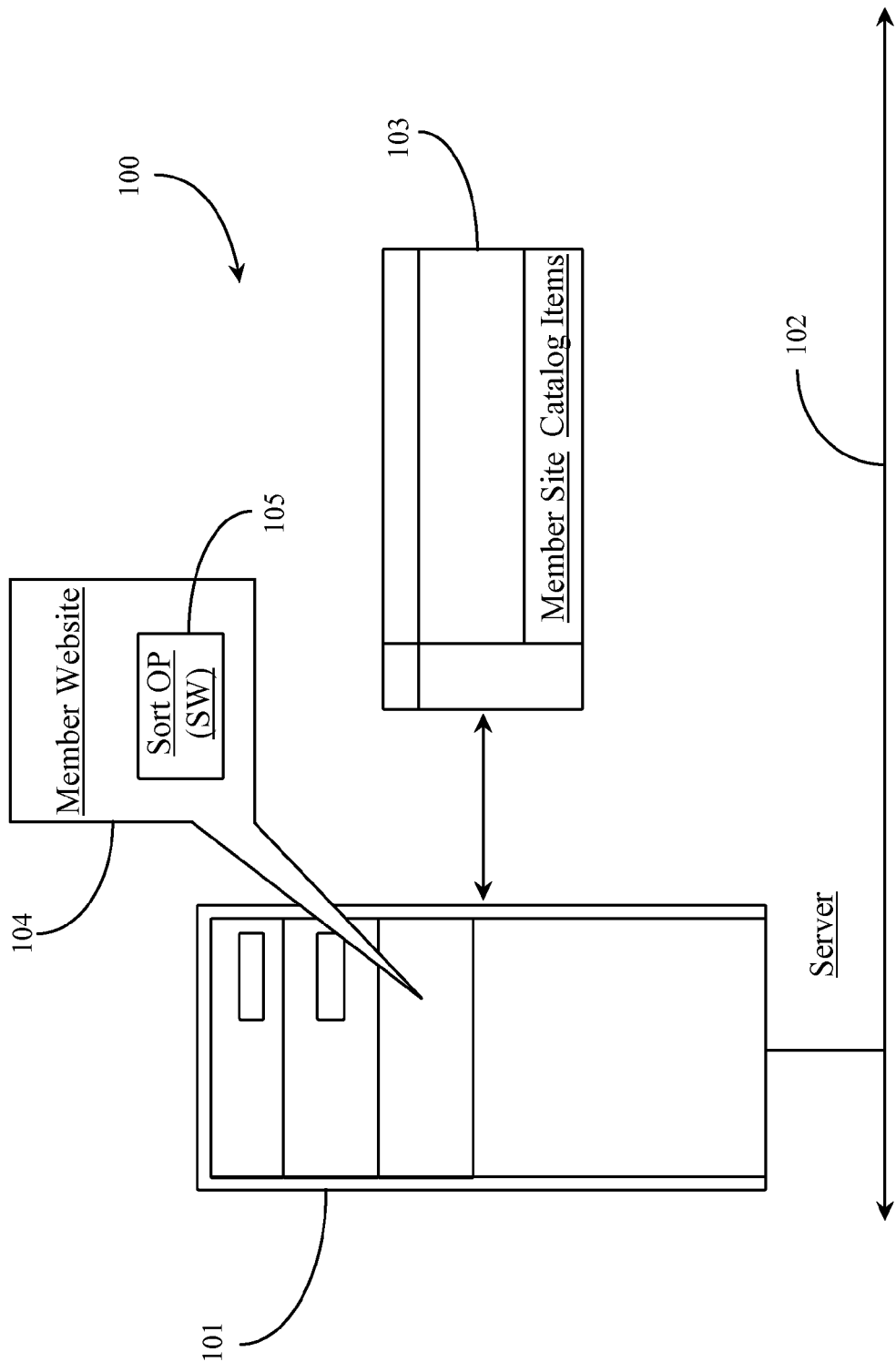
FIG. 1 is an architectural overview of a network-based server adapted to perform optimized sorting of virtual catalog items according to an embodiment of the present invention.

FIG. 1 is an architectural overview 100 of a network-based server adapted to perform optimized sorting of virtual catalog items according to an embodiment of the present invention. Overview 100 represents a basic example of a network-based server 101 connected to a digital network 102 for access by remote users operating network-capable appliances. In one embodiment server 101 is a Web server adapted to serve electronic information pages known as web pages in the art. In one embodiment web server 101 has connection to or is a virtual gaming server adapted to serve information pages to clients during online game play. Server 101 includes a digital medium adapted to contain all of the software and data required for the server to function as a web server capable of serving web pages and electronic forms.

Server 101 is connected to a digital network represented herein by a network backbone 102. Network backbone 102 represents, in a preferred example, all of the lines, equipment, and access points that make up the Internet network as a whole including any sub-networks. Therefore, there are no geographic limitations to practicing the present invention. Network 102 may be wired or wireless, corporate or private, or a public network such as the Internet network without departing from the spirit and scope of the present invention.

Server 101 is adapted to host, in this example, an enterprise website 104 also referred to herein as a member site, meaning that it is a membership website one subscribes to. Membership to a website is not specifically required in order to practice the invention. In one embodiment membership site 104 is an enterprise website that promotes online gaming and has all of the appropriate links to online gaming capability such as to an online game server and supporting networked services. Members and visitors may access website 104 and engage in various activities which may include online gaming, social interaction, and purchase of game-based currency for use in buying items from a virtual goods catalog. In another embodiment, the website may represent some other type of enterprise wherein the catalog contains real and deliverable goods for sale to members and visitors using real currency to purchase such goods directly and interactively from the goods catalog.

Server 101 has connectivity to a data where house or data repository 103. In this example, all of the website components and virtual goods catalog items are stored in the data repository accessible from the server. Server 101 may be a dedicated server for hosting only the member site and virtual catalog items for a single enterprise, or it may be a third-party host server hosting many different websites for both persons and enterprises without departing from the spirit and scope of the present invention. Member website 104 includes in association with the specific functionality of the site, a sort optimization (OP) software (SW) 105. Sort optimization SW 105 is provided for the purpose of calculating the revenue contribution value (RCV) of each of the virtual goods catalog items contained in data where house 103, and to sort any such category or sub-category of such items ordered in a display request according to the highest RCV of those items to the enterprise.

Figure 2:
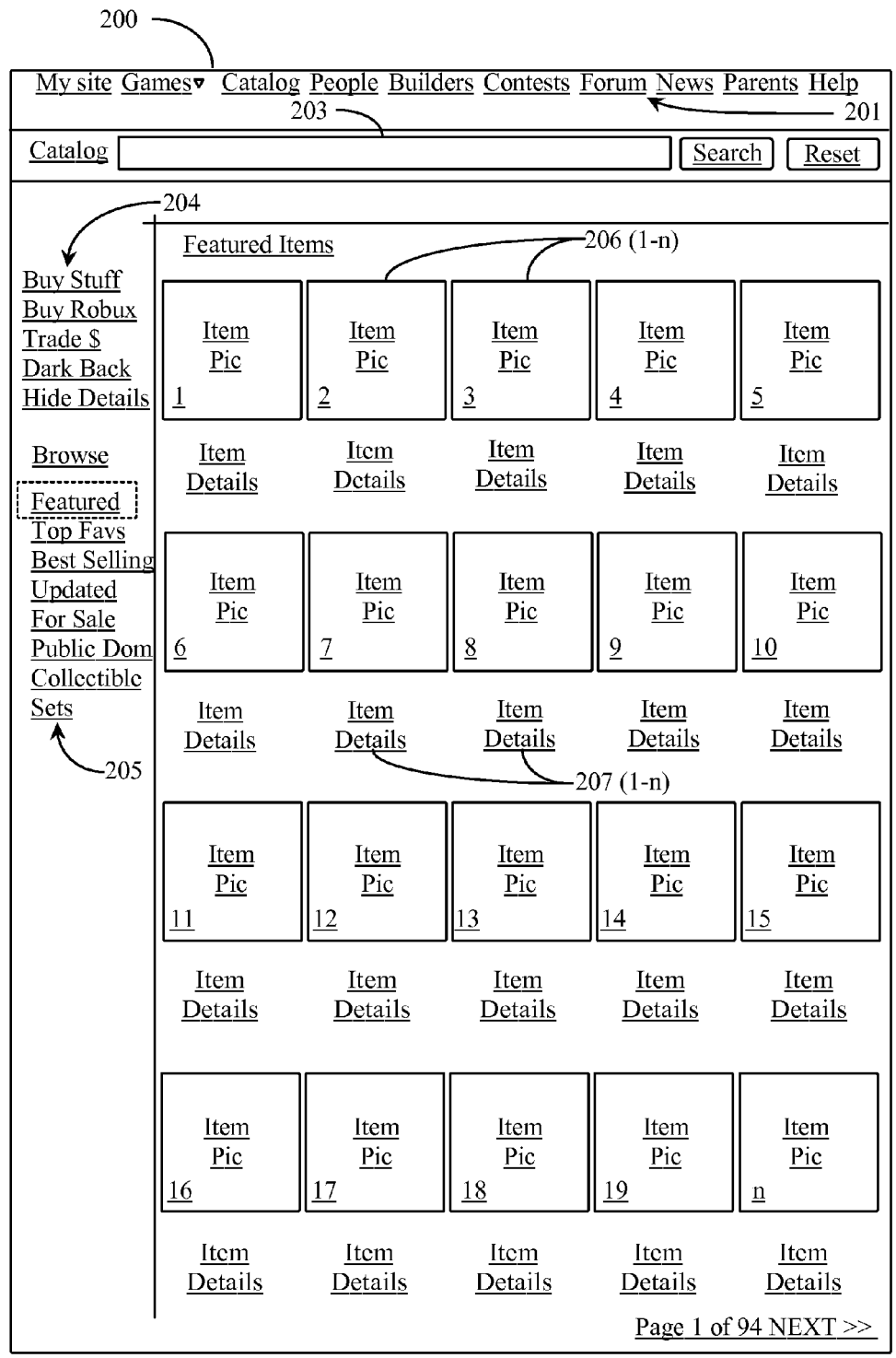
FIG. 2 is an exemplary screen shot of an electronic catalog item-display interface.

FIG. 2 is an exemplary screen shot of an electronic catalog item-display interface 200. Interface 200 is browser-based and is accessible to any visitor by selecting a link to the virtual catalog from website 104 of FIG. 1. Interface 200 includes a plurality of navigation options 201, which include links My site (personal customized page); Games; Catalog; People; Builders (builders club); Contests; Forum; News; Parents; and Help. Catalog interface 200 includes a search option 203 adapted to enable a visitor to search the catalog items using keywords, tags, or phrases. Search option 203 includes a search button to initiate the search and a reset button to begin a new search.

Interface 200 includes a sidebar area including functional options 204, which include the options Buy Stuff; Buy Robux (virtual currency); Trade S; Dark Background; and Hide Item Details. In this example, the currency used to buy virtual goods from catalog 200 is Robux. Robux can be purchased using real currency such as US dollars. The sidebar area includes another set of options 205 for ordering various categories of item display. Aside from an option for browsing the catalog, categories for displaying virtual goods items include Featured items; Top Favorite items; Best Selling items; Recently Updated items; Items for Sale; Items belonging to the Public Domain; Collectibles, and Sets. In this particular view, the catalog display is set to "Featured" items.

Featured items 206 (1-$n$) are displayed in rows of interactive thumbnails or item pictures. Although no items are pictorially illustrated in this example, items may be any conceivable gaming item or element such as a weapon, a hat, a shirt, a face for an avatar, a scepter, a place, a car, a boat, or any other virtual item that may be created by the system or by members of the website. Interface 200 displays 20 items at a time or on one page. In this example, the first page of 20 items is displayed with 93 subsequent pages of items to follow. In another embodiment, scroll bars may be provided to scroll through the items instead of browsing exclusively by page. Directly beneath each thumbnail 206 (1-$n$) displayed are detail sets or blocks 207 (1-$n$). Item details may include but are not limited to an item title, label, or name; when the item was last updated; the creator or owner of the item; the total number sold; the number of times that the item was favored; and the current price of the item in Robux (virtual currency).

For each of the display categories 205, the items are optimally sorted according to their average revenue contribution to the enterprise in a preferred embodiment. That is to say for each possible category of items that might be ordered for display, those items are displayed in descending order from the highest contributing item to the lowest contributing item. Ties may be displayed next to one another on each page of the sort. Items in the virtual goods catalog may also be displayed according to likeness, such as all hats or headgear, or all avatar faces for example. Revenue contribution to the enterprise may be measured in Robux or in real dollars considering the exchange rate between real dollars and Robux. In one embodiment physical items for sale by the hosting enterprise may be sorted in addition to or mixed in with virtual items. In one embodiment real currency is used to purchase any physical or real objects in the display that are selected for purchase.

In a preferred embodiment, the sort optimization SW derives the revenue contribution for an item as an average value considering the price of the item, how many items have been sold, and the total number of times that the item has been seen (impressions). An item impression is counted for an item any time that the item has been displayed in interface 200. An item that has not yet been displayed has 0 impressions whereas the most displayed item may have thousands of impressions. It is noted herein that the period of time inclusive of the total history of the item is arbitrary. There may be sorts based on a predefined window such as the last 6 months or some other defined time window. Sorts may also consider user demographics if known such as purchase history, gender (male or female), financial status (wealthy or poor), as well as other demographic factors. Colors of features of items may also be modified based on gender information such as serving pink hats first if the user is female and entered a search term hats, for example.

As the activity relative to the virtual catalog evolves over time, the contribution values for all of the items in the catalog are subject to change or revision. The sort optimization SW may be run periodically at specified intervals or it may continuously run in the background as users are interacting with the site. A user may order virtually any type or category of item display such as by entering a search term faces, for example to display avatar faces available to them. In any of the conceivable categories that may be set or may be created by search interface, the results in display are optimized by RCV. The optimization on the virtual catalog items for revenue contribution value may be transparent to the visitor interacting with display 200. In one embodiment the user is aware that the items are sorted according to revenue contribution value, typically with the highest contributors displayed first.

Figure 3:
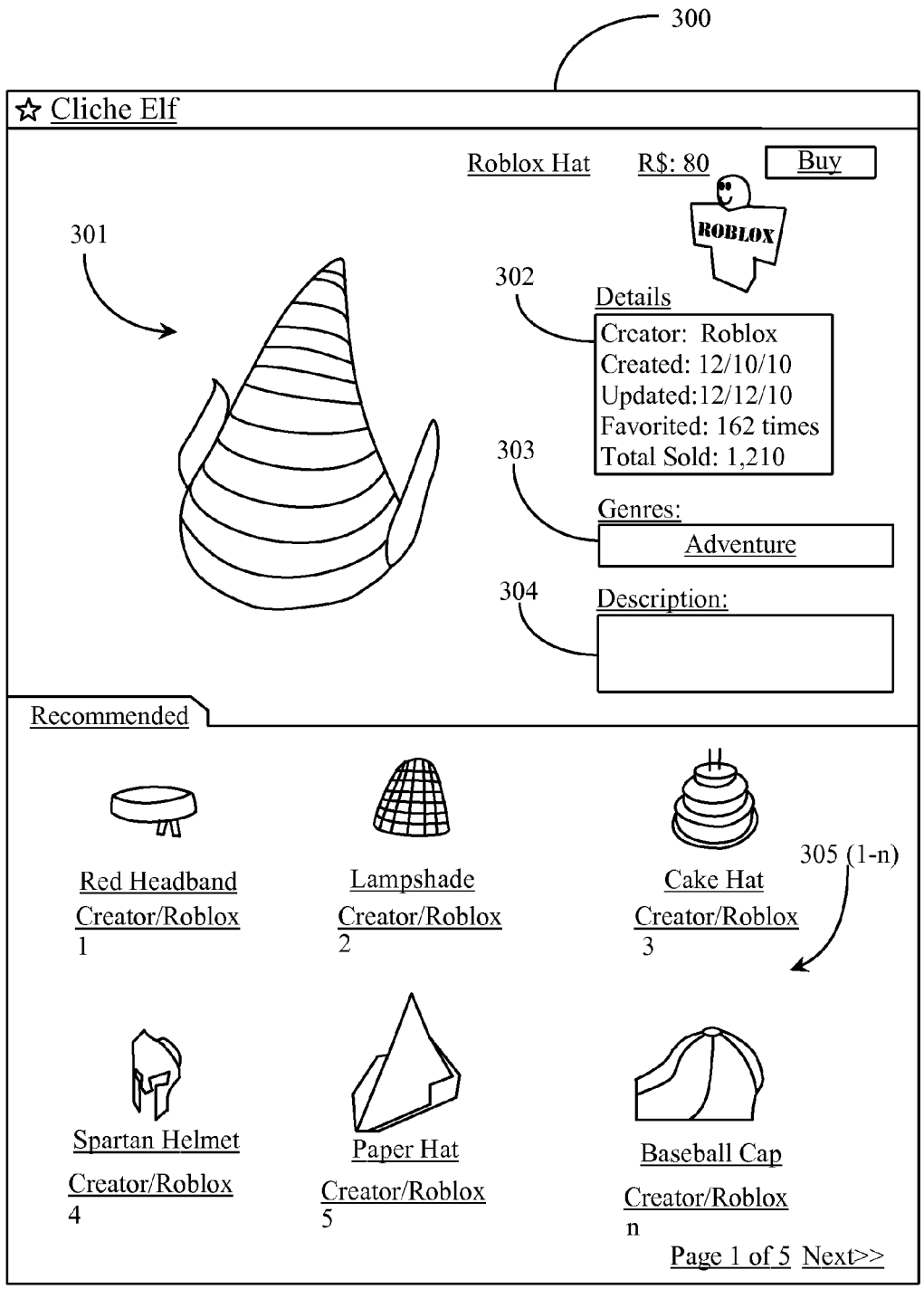
FIG. 3 is an exemplary screen shot of a catalog item resulting from interaction with a thumbnail item on FIG. 2.

FIG. 3 is an exemplary screen shot of a catalog item display 300 resulting from selection of a thumbnail item on FIG. 2. Interface 300 displays a selected item, cliché elf 301, in an enlarged view consistent with further interaction with the interface of FIG. 2. In this example, item 301 is a hat created by Roblox (company name). The cost of the elf hat is R$:80 or 80 robux. The Roblox avatar is displayed next to a "Buy" button enabling the visitor to purchase the item at any time.

A set of details 302 is provided that lists the creator; the date the item was created; the date that the item was last updated; the number of times that the item was favorited [added to someone's favorites folder or list]; and the total number of times the item was sold. A box 303 includes the genre of the displayed item and a description box 304 includes space for provision of a more detailed description of the item. In this example, a revenue contribution value of the item to the enterprise is not listed or visible. However, in an embodiment where such optimization is visible to the user, the contribution value may be displayed as one of the details about the item or anywhere else on the display.

Below item 301 displayed in enlarged view, a sub window containing recommended items 305 (1-n) is provided. In this example, the system bases further recommended items on the item the visitor selected for display in enlarged view. Items 305 (1-n) include a red headband, a lampshade, a cake hat, a Spartan helmet, a paper hat, and a baseball cap. In one embodiment all of these recommended items displayed beneath the enlarged view of item 301 are optimized in the sort for RCV to the enterprise. A separate or tail-end algorithm may be triggered when the user selects an item for view that results in display in the second window of the recommended items. It is noted herein that there are 5 pages of recommended items in this example, but there may be fewer or more additional pages or none at all without departing from the spirit and scope of the present invention.

Figure 4:
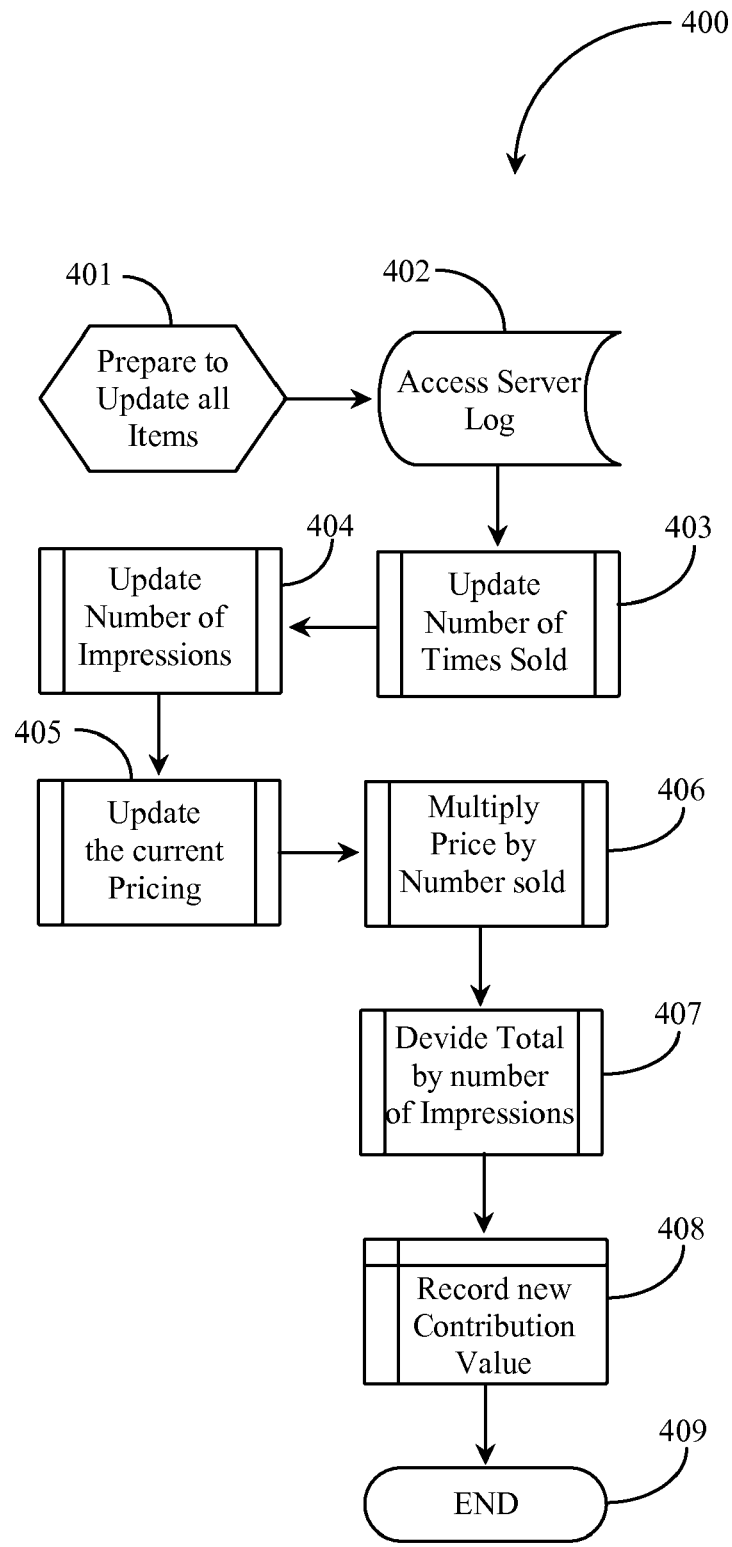
FIG. 4 is a process flow chart illustrating steps for optimizing a sort for virtual catalog items.

FIG. 4 is a process flow chart 400 illustrating steps for optimizing virtual catalog items in store for revenue contribution value. At step 401, the software executed from a digital medium prepares to update all items in the virtual catalog that are stored in the data where house or repository. The software accesses the server log at step 402 to update the data about the items in store. At step 403, the system counts the number of times each item was sold. A predefined time window may be contemplated for the purpose of update such as updating each item considering the time passed since the last good figures were compiled.

At step 404, the SW updates the number of impressions of each of the items. The number of impressions for an item is the number of times the item has been displayed for a user. At step 405, the SW may update the current pricing of all of the items in the data repository. It is not required that steps 403-405 maintain their current order in the process. At step 406, the SW multiplies the current price of each item by the number of times that the item has been sold. The price point may be averaged over the real price points noted in the system. At step 407, the SW then divides the total for each item derived in step 406 by the total number of impressions updated at step 404. This calculation produces the most recent revenue contribution value per item. The updated values are recorded for each item at step 408. When a sort order is received for item display, the contribution values are hierarchically ordered in any category or sort of any of the items.

At step 409 the process ends. Updates to all items stored may be undertaken periodically or otherwise as needed. In one embodiment, updating occurs in real time as the items come up in interaction with users. That is to say that an item is updated whenever the item is subject to any change resulting from interaction or edit.

Figure 5:
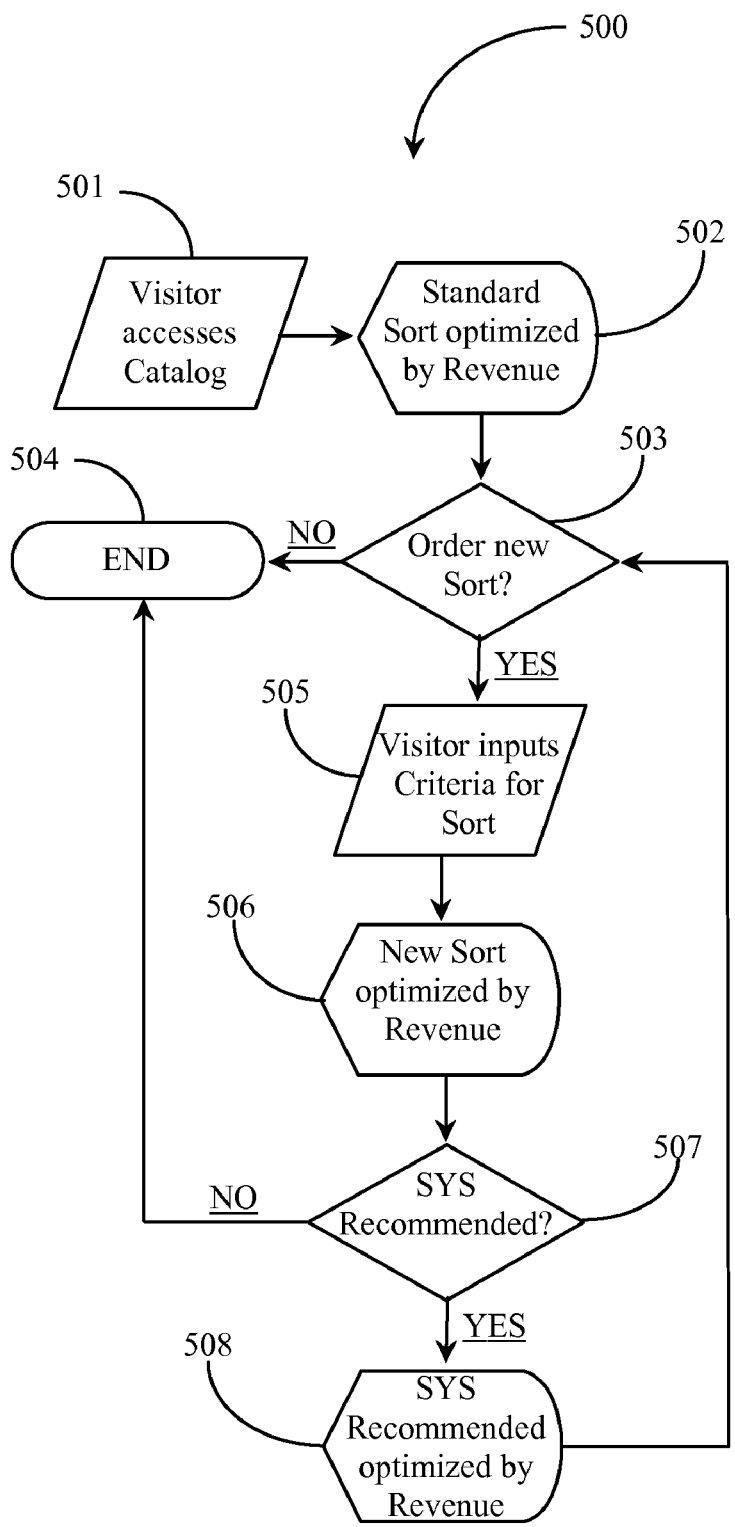
FIG. 5 is a process flow chart illustrating steps for acquiring an optimized sort order of virtual catalog items for display.

FIG. 5 is a process flow chart 500 illustrating steps for acquiring an optimized sort order of virtual catalog items for display according to an embodiment of the present invention. At step 501, a visitor accesses the virtual catalog of items. In one embodiment, the items are first displayed according to a standard system sort like "featured" items. In one embodiment, users may have personalized sort orders that vary from user to user where the system defaults the first sort order of items displayed according to the identification of the user and the user's personal preference if any. In step 502, the first default sort order is optimized for revenue contribution in a preferred embodiment.

At step 503, the user may decide whether to order a new sort of items such as by selecting a pre-defined category of item for display, or by ordering a custom display of items using the search function. If the user chooses not to order a new sort at step 503, then the process may end for that user at step 504. If at step 503 the user determines to order a new sort, the visitor may select a pre-defined category or input any criteria for a sort at step 505.

At step 506, a new item sort for items for display is performed according to the results of step 505. Each of the items may already include its average revenue contribution value listed with, tagged to or otherwise associated with it. The new display may include one or more pages of items the user may navigate through. In one embodiment the items are technically displayed but scrolling must occur in order to view a full detailed list or thumbnail view of items. At step 507, the SW may determine if there are any system recommended items available for display based on the user's selection of an item, or based simply on the particular sort ordered. If there are no recommended items to view at step 507, then the process may simply end at step 504. If there are system recommended items available for display along with the ordered sort or in addition to the ordered sort at step 507, then at step 508, those items are served according to optimization for revenue contribution value to the enterprise.

A pseudo formula that may accomplish the goal of the present invention may be expressed as follows: For any item V=RCV/impression=Total \$/# of impressions=(price) (# of sales)/# of impressions. It will be apparent to one with skill in the art that the sort optimization SW and system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. A computing appliance comprising:
a processor;
an interface to the Internet;
a data store containing a number of virtual catalog items for service through a website; and
software executing from a machine-readable physical medium, the software causing the computing appliance to:
record a number of impressions of each of the virtual catalog items that has occurred over a defined period;
record a number of sales of each of the virtual catalog items that has occurred over the defined period;
calculate the average sales price for each of the virtual catalog items for the defined period;
multiply the average sales price by the number of sales recorded previously for each item;
divide the total sales figure recorded for each item by the total number of impressions recorded for that item over the defined period deriving a revenue contribution value for each item; and
in response to a request to display items, serving individual ones of the items included in the request according to highest revenue contribution value for those items.

2. The computing appliance of claim 1, wherein the appliance is a web server.

3. The computing appliance of claim 1, wherein the virtual catalog is navigated by a display interface on a web page.

4. The computing appliance of claim 1, wherein the items are gaming elements and or physical items for sale.

5. The computing appliance of claim 1, wherein the sales price is expressed in virtual currency.

6. The computing appliance of claim 5, wherein the virtual currency used to buy virtual catalog items is purchased by users with real currency.

7. The computing appliance of claim 1, further including a machine instruction inserted before the display function, for inserting one or more items into the display based on a predicted likelihood of the one or more items being purchased.

8. The computing appliance of claim 7, wherein the predicted likelihood of purchase is based on one or more demographic attributes of the instant user.

9. The computing appliance of claim 1, wherein the hierarchical sort order is preserved subject to categorical, keyword, or author-based search of the virtual catalog items for customized display.

10. A method provided by software stored in memory and executing from a computing appliance, for determining a hierarchical order of display of virtual catalog items contained in a virtual catalog accessible from a web page comprising the steps:
(a) for each of a number of items in the virtual catalog, calculating, by the software, a number of impressions of the items that occurred over a defined period;
(b) for each or the number of items in the virtual catalog, calculating a number of sales of the virtual item that occurred over the defined period;
(c) for each of the number of items in the virtual catalog, calculating the average sales price for the virtual item over the defined period;
(d) for each of the number of items in the virtual catalog, the software multiplying the average sales price deduced in (c) by the number of sales deduced in (b) deriving a total sales value for each item;
(e) dividing the total sales values for each item deduced in (d) by the total number of impressions deduced in (a) of that item deriving a revenue contribution value; and
(f) in response to a request received at the computing appliance, performing a hierarchical sort of virtual catalog items for item display, displaying the items according to revenue contribution value per item included in the request.

11. The method of claim 10, wherein in step (a), the defined period is the total history of each item.

12. The method of claim 10, wherein the virtual catalog is navigated by a display interface on a web page.

13. The method of claim 10, wherein virtual catalog items are gaming elements and or physical items for sale.

14. The method of claim 10, wherein in step (c), the sales price is expressed in virtual currency.

15. The method of claim 14, wherein the virtual currency used to buy virtual items is purchased by users with real currency.

16. The method of claim 10, further including a step inserted before display at step (t), for inserting one or more virtual catalog items into the visible display based on a predicted likelihood of the one or more items being purchased by the user.

17. The method of claim 16, wherein the predicted likelihood of purchase is based on one or more demographic attributes of the instant user.

18. The method of claim 10, wherein in step (f), the hierarchical sort order of revenue contribution value is preserved subject to categorical, keyword, or author-based search of the virtual items for customized display.

19. The method of claim 10, wherein in step (f), the virtual catalog items included in the request are displayed according to highest revenue contribution value first.

* * * * *